United States Patent
Ward et al.

(10) Patent No.: US 9,071,928 B2
(45) Date of Patent: Jun. 30, 2015

(54) TRUSTED MODE LOCATION SERVICE FOR MOBILE DEVICE ACCESS TO PRIVATE NETWORK BASED APPLICATIONS

(75) Inventors: Rachel Yu-Yin Ward, Basking Ridge, NJ (US); Atul Thaper, Flemington, NJ (US); Biren A. Patel, San Ramon, CA (US)

(73) Assignee: Cellco Partnership, Basking Ridge, NJ (US)

(*) Notice: Subject to any disclaimer, the term of this patent is extended or adjusted under 35 U.S.C. 154(b) by 270 days.

(21) Appl. No.: 13/610,646

(22) Filed: Sep. 11, 2012

(65) Prior Publication Data

US 2014/0073355 A1    Mar. 13, 2014

(51) Int. Cl.
*H04W 24/00*    (2009.01)
*H04W 4/02*    (2009.01)

(52) U.S. Cl.
CPC ...................................... *H04W 4/02* (2013.01)

(58) Field of Classification Search
CPC ....... H04W 4/02; H04W 12/08; H04W 64/00; H04W 12/06
See application file for complete search history.

(56) References Cited

U.S. PATENT DOCUMENTS

| | | | |
|---|---|---|---|
| 7,665,132 B2* | 2/2010 | Hisada et al. | 726/15 |
| 7,826,830 B1* | 11/2010 | Patel et al. | 455/414.1 |
| 2003/0115344 A1* | 6/2003 | Tang et al. | 709/229 |
| 2004/0160909 A1* | 8/2004 | Sheynblat | 370/328 |
| 2005/0159170 A1* | 7/2005 | Puranik et al. | 455/456.1 |
| 2013/0046976 A1* | 2/2013 | Rosati et al. | 713/168 |

* cited by examiner

*Primary Examiner* — Vladimir Magloire
*Assistant Examiner* — Shantell L Heiber

(57) ABSTRACT

In response to a location assistance request initiated by a mobile device on a private network and directed to a data access port of a location server in a public mobile communication network, a source network address is extracted from the received request. If the extracted source network address is determined to be associated with a trusted private network domain, location assistance data obtained by the location server is provided to the mobile device on the private network without requiring any proprietary messaging schemes or application-specific authentication credentials.

20 Claims, 5 Drawing Sheets

TRUSTED MODE LOCATION SERVICE FOR MOBILE DEVICE ACCESS TO PRIVATE NETWORK BASED APPLICATIONS

BACKGROUND

Modern public mobile communication networks allow users or subscribers to access advanced data communication services using their respective mobile devices. Applications that use these data services may take various forms and may include location-based service applications provided by the operator of the mobile communication network or a third-party service provider. Common examples of location based services include mapping and navigation. To support such location based services, a wireless carrier or operator of a mobile communication network may provide location assistance services, also known as assisted GPS (or "A-GPS"), to mobile devices through the mobile communication network. A-GPS allows mobile devices to utilize resources of the mobile communication network to improve performance and reduce latency in acquiring GPS location information, particularly in areas with poor GPS signal reception.

In addition to such A-GPS for mobile handset devices (e.g., cellular phones) on the mobile communication network, there has been a growing demand in recent years for wireless network-based A-GPS for "non-traditional" mobile devices on a private network. Such "non-traditional" devices may include, for example, tracking devices equipped with GPS receivers. Such non-traditional mobile devices may be similar to mobile devices for use on the public mobile communication networks but configured for private network operation, however, in some instances the non-traditional mobile devices will have more limited components and operational capabilities.

For example, an enterprise may use mobile location tracking devices in a private network for asset tracking purposes. Such a device will have a transceiver or other communication interface for communications over the private network as well as some GPS reception and processing capability. However, the tracking device may need network assistance to efficiently determine location from GPS signals. Such a mobile device may access an A-GPS service of a public wireless network service provider (or "carrier") for assistance in determining geographic location, that is to say, in obtaining final GPS location fixes.

The carrier's wireless network generally includes an A-GPS server for processing location requests from any mobile device based on a device identifier and a network address associated with the device. In general, devices on a private network are assigned private network addresses that are translated into a public network addresses (e.g., a public Internet Protocol or "IP" addresses) by a Network Address Translation or "NAT" device of the private network for communicating with computing devices external to the private network. However, since device authentication by the A-GPS server of the carrier's wireless network is based in part on a carrier-specific network address assigned to each mobile device by the wireless network, the wireless network would be unable to authenticate devices sending requests from private networks.

Conventional solutions attempt to address such authentication issues regarding devices operating via a private network by implementing a proprietary messaging scheme at each device and assigning authentication credentials (e.g., unique identifier and password) to each private network device, e.g., for accessing a particular enterprise application. However, such conventional solutions may cause reduced performance and increase network latency due to the additional operations needed for processing proprietary messages for different private networks and authenticating the mobile device for different applications associated with each private network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
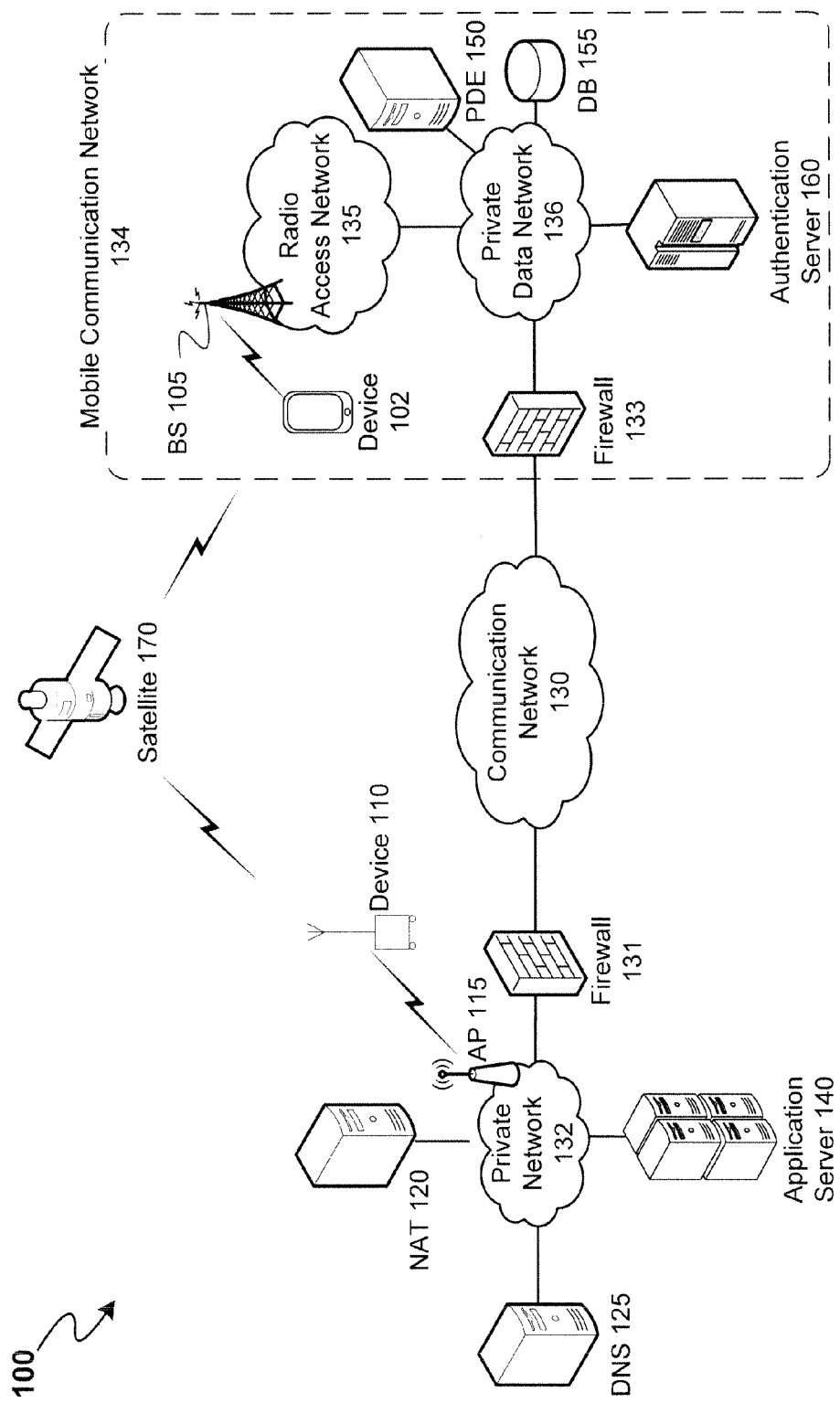
FIG. 1 illustrates an exemplary network environment for providing a variety of mobile communication services, including location assistance services for mobile devices on a private network.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The systems and techniques disclosed herein enable a wireless carrier or operator of a mobile communication network to provide location assistance services for mobile devices on a private network, for example, without requiring any proprietary messaging schemes or application-specific authentication credentials.

In an example, the mobile devices on the private network are "non-traditional" mobile location devices, such as, for example, mobile location tracking devices each equipped with a Global Positioning System ("GPS") receiver. However, it should be noted that the subject technology is not intended to be limited thereto and may be applied to traditional mobile devices (e.g., mobile handsets or tablet computers) configured to operate via a private network. Further, a NAT server or gateway device of the private network is configured to translate a private network address assigned to each mobile device on the private network into a public network address (e.g., public IP address) selected from a range of public network addresses associated with the private network, e.g., IP address range assigned to the private network for Internet communications initiated by devices in or associated with the private network.

In an example, a location assistance server (or simply, "location server"), also referred to herein as a Position Determining Entity (PDE), of the public mobile communication network is configured to treat a particular private network as a trusted domain. In this example, the location server automatically allows access to the functionality of a location assistance service to any mobile device having a public network address within the range of public network addresses corresponding to the private network or trusted domain in this example. In some implementations, the location server of the mobile communication network assigns a dedicated data pathway or access port to each trusted domain or private network. For example, mobile devices on a private network may use the dedicated data access port assigned to the particular private network to send location assistance requests to the location server for accessing the functionality of the location assistance service provided by the mobile communication network.

By recognizing that a request originates from a trusted private network domain (e.g., based on the request's source network address), the location server is able to bypass any separate authentication of the mobile device that might otherwise involve, for example, any proprietary messaging schemes or authentication credentials associated with a particular location based application or service. This also allows the location server to process location assistance requests received from devices on a trusted network, without having to communicate with an authorization and authentication (or "AAA") server in the mobile communication network. Thus, an advantage of the technology described in detail by way of examples below includes alleviating the additional burden of implementing separate authentication processes in the mobile communication network for different proprietary messaging schemes or third-party location based applications.

While the examples provided below are described in reference to location tracking devices, the techniques described herein are not intended to be limited thereto and may be used for any type of mobile device having location-determination capabilities. Examples of such devices may include, but not limited to, portable handsets, smart-phones, tablet computers and personal digital assistants.

The detailed description below uses a number of terms with respect to various system components and operations. Although generally known, use of several of these terms may not be strictly standardized. For the convenience of the reader, the following definitions for some of the relevant terms are presented, as used by way of example in the detailed description below.

The terms "operator," "wireless carrier" and "carrier" are used herein interchangeably to refer broadly and inclusively to any provider or supplier of mobile network communication services, including services for the transmission of real-time voice and data communications for users/subscribers of mobile devices on public or private networks through different types of communication networks. Such communication networks include, but are not limited to, a wireless or mobile radio access network for providing mobile communication services to the general public. An operator or carrier can be, for example and without limitation, a wireless service provider that provides various communication services to mobile phone subscribers. The services provided by the carrier may include, for example and without limitation, location assistance services via the carrier's mobile communication network and, for example, over Internet Protocol (IP) networks including the Internet or similar networks. In some implementations, services involving the communication of data may be provided by the wireless carrier/operator using a separate communication channel via a different type of radio access network (e.g., 3G or 4G data network) than the technology (e.g., One (1) times (x) Radio Transmission Technology or "1 xRTT") and associated radio access network used for voice calls routed through the overall mobile communication network.

The term "client" is used herein to refer broadly to any process configured to consume a functionality of an application offered by an application "server." For example, when a client uses an application, the client is generally utilizing at least one function of the service. Such a client may be executed at any type of computing device including, for example and without limitation, a desktop computer or workstation, a mobile device, or a host or network device that may operate at other times as a server to other clients. A server may be any type of computing device capable of communicating data to one or more clients over a communication network. Further, a client can be any type of remote or local process with respect to the computing device executing or hosting the service. Also, a client can be another application or service.

Reference now is made in detail to the examples illustrated in the accompanying drawings and discussed below. FIG. 1 illustrates a functional block diagram of an exemplary wireless network environment 100 for providing mobile voice telephone services and various data services, including location assistance services, to different devices and systems across different communication networks. In the example illustrated in FIG. 1, network environment 100 includes a communication network 130 that facilitates communications between devices and systems on different private networks including, but not limited to, a private network 132 and a mobile communication network 134, as will be described in further detail below.

In the example shown in FIG. 1, a wireless carrier or operator of mobile communication network 134 provides a location assistance service for different types of mobile devices through a radio access network 135 and a private data network 136. Mobile communication network 134 supports various telecommunications standards and protocols. Examples of such standards and protocols include, but are not limited to, Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." However, it should be noted that the present techniques are not intended to be limited thereto and may be implemented using other types of mobile communication network technologies. While only radio access network 135 is shown in FIG. 1, mobile communication network 134 may include multiple radio access networks (e.g., including a 3G or 4G data network) for supporting different types of communication services (e.g., A-GPS service), as described above. Additionally, communication network 130 may include an IP Multimedia Subsystem ("IMS") for voice and multimedia communications over the Internet and IP packet-based networks.

As shown in FIG. 1, a mobile device 102 is configured to communicate over the air with a base station (BS) 105 and through radio access network 135 of mobile communication network 134. Although only device 102 and base station 105 are shown, radio access network 135 may include additional base stations to support over the air communications for additional mobile devices. Device 102 in this example can be any type of mobile computing device that is capable of communications over one or more networks and that can be used by most subscribers to access voice and data communication services, including location assistance services offered by the carrier or operator of mobile communication network 134 through radio access network 135. Examples of such mobile computing devices include, but are not limited to, portable handsets, smart-phones, tablet computers, personal digital assistants and other general consumer mobile devices.

In addition to the aforementioned general consumer mobile devices, mobile communication network 134 provides data communication services for specialized or "non-traditional" mobile devices, e.g., through private data network 136. In contrast with general consumer mobile devices, such non-traditional mobile devices may be designed for a particular application-specific purpose such as, for example, tracking the location of different assets of an enterprise organization, as will be described in further detail below with respect to a mobile device (also referred to herein as a "mobile station") 110. As such, non-traditional mobile devices such as mobile device 110 may lack the traditional user input and output interfaces (e.g., a T9 or QWERTY keypad and/or touch-screen display) typically associated with general consumer mobile devices.

As shown in FIG. 1, mobile device 110 is communicatively coupled to a NAT 120, a domain name system (DNS) server 125 (also referred to herein as "DNS 125") and an application server 140 through private network 132 via an access point (AP) 115. In this example, mobile device 110 is a location tracking device configured to access a location based service provided by application server 140 through private network 132. Mobile device 110 may be used to track, for example, the current geographic location of an enterprise asset in transit as it moves between different geographic locations. Examples of different enterprise assets that may be tracked include, but are not limited to, a vehicle, piece of equipment, freight containers or other asset that can be moved from one geographic location to another. Thus, mobile device 110 may be physically attached to the asset (or container housing the asset during transit). While only mobile device 110 and access point 115 are shown in FIG. 1, private network 132 can be used to facilitate data communications for additional mobile devices and access points (not shown). Further, such access points may be distributed across different geographic locations, for example, at different enterprise worksites where an enterprise may want to track location of its shipping containers.

In some implementations, private networks 132 and 136 are each Internet Protocol (IP) packet based data networks behind firewalls 131 and 133, respectively. The firewalls 131 and 133 function as a security layer to maintain secure communications between the system components of each private network to prevent unauthorized access by devices external to each of the respective private networks 132 and 136, even as those networks connect to and communicate through another network 130 that may be public, such as the public Internet. Either of the firewalls 131 and 133 may be implemented using, for example, a gateway server in the respective private network 132 or 136. While not shown in FIG. 1, each of private networks 132 and 136 may include any number of additional intermediate network routers, gateways or other network components/devices.

Mobile device 110 in this example includes a GPS receiver for tracking the geographic location of the asset to which it is attached over time, based on processing of positioning signals received from one or more GPS satellite(s) 170. Although only a single satellite 170 is shown in FIG. 1, positioning signals from any number of orbiting satellites may be used by device 110 for determining the current geographic location of the device 110 (e.g., latitude and longitude coordinates registered by the GPS receiver integrated with device 110). In some implementations, mobile device 110 may be configured to report the asset's geographic location at periodic intervals. The duration of the intervals may be predetermined as desired for a particular implementation. Alternatively, mobile device 110 may be configured to report its location only upon receiving a location request from application server 140 (or other network element or device associated with private network 132). In addition to a GPS receiver, mobile device 110 has a communication interface for sending and receiving communications to and from other devices on private network 132 via access point 115. Such other devices include, for example, application server 140, NAT 120, DNS 125 or other devices that may be associated with private network 132. Further, mobile device 110 may have at least one processor (e.g., for processing location requests from server 140) and a memory or local data store (e.g., for storing GPS location information to be returned in response to a location request).

NAT 120 of private network 132 may be used to implement, for example, any of various network address translation (NAT) mapping schemes. Examples of different NAT schemes that NAT 120 may implement include, but are not limited to, one-to-one, one-to-many and/or many-to-many mapping schemes. In some implementations, NAT 120 is configured to manage the flow of data communication between mobile device 110 or other devices of private network 132 and systems or devices external to private network 132 (e.g., PDE 150 of mobile communication network 136). In an example, NAT 120 may assign a unique source data communication address (also referred to herein as "source network address") to mobile device 110 for location assistance requests from device 110 that are directed to destination data communication or network address corresponding to such external devices located outside of private network 132. The destination network address to which location assistance requests from mobile device 110 are directed corresponds to PDE 150. In some implementations, DNS 125 is configured to provide mobile device 110 the destination network (or IP) address and/or port of PDE 150 for sending location assistance requests.

In an example, NAT 120 may assign mobile device 110 a unique source network address including a combination of a unique public IP address and a unique port number, where both the public IP address and port assigned to mobile device 110 are tracked in private network 132. It should be noted that the source network address in this example is not necessarily a dedicated network address that is always assigned to mobile device 110. It should also be noted that this source network address is considered "unique" for purposes of this example as it remains assigned to device 110 for each location assistance request, e.g., until a response to the request is received from PDE 150, as will be described in further detail below. In a different example, the source network address assigned to mobile device 110 may be, for example, a domain name that DNS 125 resolves to a private IP address within private network 132.

In some implementations, PDE 150 assigns a dedicated access port to each trusted domain or private network, including private network 132, as described above. For example, mobile device 110 (and other mobile devices) on private network 132 may direct location assistance requests to the dedicated data access port assigned to private network 132. In particular, the location assistance requests may be directed to a destination network address corresponding to PDE 150. The destination network address may include, for example, a combination of a unique network (or IP) address of PDE 150 and a port number corresponding to the access port dedicated for location assistance requests originating from private network 132. While only PDE 150 is shown in FIG. 1, mobile communication network 134 may include additional PDEs that each implement the functionality of the location assistance service described herein. In an example, private network 132 and other trusted private networks may be assigned a dedicated destination address including a unique network (IP) address and port number of one PDE selected from among the multiple PDEs of mobile communication network 134.

In some implementations, a pool of data connections corresponding to different data access ports of PDE 150 may be used to mitigate the potential strain on system resources that may be caused by multiple location assistance requests from different mobile devices on private network 132. The available data connections and access ports within the pool may be used by PDE 150 to process location assistance requests originated by mobile device 110 and other mobile devices (not shown) on private network 132. For example, a set of data access ports may be allocated at PDE 150 specifically for location assistance requests originating from private network 132. Further, the different access ports within the allocated set may be shared across multiple devices on private network 132. Accordingly, mobile device 110 and other devices on private network 132 may be configured to direct location assistance requests to one of the shared access ports in the set of ports of PDE 150 allocated for private network 132.

In a further example, different sets of access ports of PDE 150 may be designated for different trusted private networks. Thus, an available access port from the set designated to a particular trusted private network may be allocated dynamically, in response to a received location assistance request originated by a mobile device on the particular trusted private network. In a different example, PDE 150 may be configured to assign any one of its available data access ports for each location assistance request originating from multiple devices on different trusted private networks known to PDE 150. In this example, all of the access ports of PDE 150 are combined into a single pool of data access ports that can be shared amongst different devices on different trusted private networks. An advantage of such a port allocation scheme is that it can be used to improve data access port and connection management overhead, e.g., during times when there may be a relatively large volume of location assistance requests originating from multiple trusted private networks.

NAT 120, DNS 125 and application server 140 can be implemented using any type of computing device having at least one processor, a memory and at least one network communication interface for communicating with other devices through private network 132 and other networks including, but not limited to, communication network 130, and mobile communication network 134 including both radio access network 135 and private data network 136, as described above. Each of NAT 120 and DNS 125 may be implemented as, for example, a router or dedicated server, which is configured to exchange network data communication (e.g., in the form of IP data packets) between devices within private network 132 and those external devices further configured to modify or translate the network address information associated with such data communication (e.g., IP address information in IP data packet headers). Alternatively, NAT 120 and DNS 125 may be integrated with or implemented as different components of application server 140 for providing the above-described NAT and domain name service functionality.

Also, as shown in FIG. 1, a PDE 150 is communicatively coupled to a database 155 and an authentication server 160 through private network 134. Database 155 can be used to store any type of data including, for example and without limitation, network address information associated with different private networks, as will be described in further detail below. In some implementations, PDE 150 provides location assistance (or A-GPS) services for different types of mobile devices including, but not limited to, device 110 through communication network 130 and in this example, private network 132. As noted previously, device 110 may be equipped with a GPS receiver. However, as device 110 may not have a clear line of sight to receive positioning signals from satellite(s) 170 (or at least ones of sufficient strength to reliably demodulate ephemeris data), device 110 can send a location assistance request to PDE 150 via communication network 130. In some implementations, the location assistance request from device 110 is routed through private network 132 to NAT 120, which in turn forwards the request to PDE 150 via communication network 130. NAT 120 may be a router or gateway device of private network 132 for routing communications between devices (including device 110) on private network 132 and computing devices external to private network 132 (e.g., PDE 150). In an example, NAT 120 implements a network address translation mapping scheme for mapping a private IP address of mobile device 110 to a public IP address. The public IP address is included with each location assistance request sent to PDE 150. As discussed above, the public IP address assigned to mobile device 110 for a location assistance request may be selected by NAT 120 from a pool or range of public IP addresses associated with private network 132. NAT 120 may use any of various network address translation (NAT) mapping schemes including, for example, one-to-one, one-to-many and/or many-to-many mapping schemes.

In response to the receipt of a location assistance request, PDE 150 may provide geographic location information or assistance data to mobile device 110 via communication network 130. The geographic location information from PDE 150 may include, for example and without limitation, the location of one or more satellite(s) 170. For example, satellite(s) 170 may correspond to one or more orbiting satellites that are determined by PDE 150 to be located within a predetermined proximity radius of a current geographic location of device 110. In some implementations, the current geographic location of device 110 may be determined based on geo-location or positioning signals from one or more sources including, but not limited to, cell-ID, line-of-sight signals from a GPS, and/or locations of Wi-Fi access points. Alternatively, the relevant geographic location that PDE 150 uses to locate the appropriate satellite(s) 170 may correspond to, for example, access point 115 (e.g., nearest access point to the current location of mobile device 110).

In general, access point 115 may serve, for example, as a hub for radio communications over private network 132 and may support sub-layers of an air-link protocol carried for transmitting and/or receiving data packets to and/or from other devices and systems on private network 132 including, NAT 120, DNS 125 and application server 140. In some implementations, access point 115 may use any of various access technologies such as global system for mobile communications ("GSM"), general packet radio service ("GPRS"), code division multiple access ("CDMA"), ultra mobile broadband ("UMB"), long term evolution ("LTE"), and/or WiMax. However, it should be noted that access point 115 is not intended to be limited to these technologies. Also, it should be noted that access point 115 may be one of several access points allowing mobile device 110 and other similar devices (also not shown) to connect to private network 132, although, for ease of discussion, only mobile device 110 and access point 115 are shown.

In some implementations, PDE 150 provides an A-GPS service having at least two modes of operation including, but not limited to, a mobile station assisted (MSA) mode and a mobile station based (MSB) mode. In MSA mode, the A-GPS functions of PDE 150 may include, for example, calculating the position of mobile device 110 based on location measurements, as determined by mobile device 110 (or integrated GPS device thereof) from GPS positioning signals transmitted by satellite(s) 170. In MSB mode, mobile device 110 calculates the position itself. Thus, an advantage of MSA mode is that it enables device 110 to acquire a GPS location fix on its current geographic location without having to perform the associated complex computations for location positioning itself. In either mode, mobile device 110 receives location assistance data from PDE 150, e.g., via communication network 130 directly or through private network 132. Mobile device 110 uses the received data to locate satellite(s) 170, which including one or more GPS satellites located near an approximated location and acquire positioning signals from the visible satellites. The location assistance data sent by PDE 150 may include, but are not limited to, ephemeris data and an almanac for satellite(s) 170 as well as any other assistance data that may be relevant for a particular implementation. Additional functions and characteristics of PDE 150 and other network devices and systems within network environment 100 for implementing the location assistance service functionality disclosed herein will be described in further detail below with reference to FIG. 2.

Figure 2:
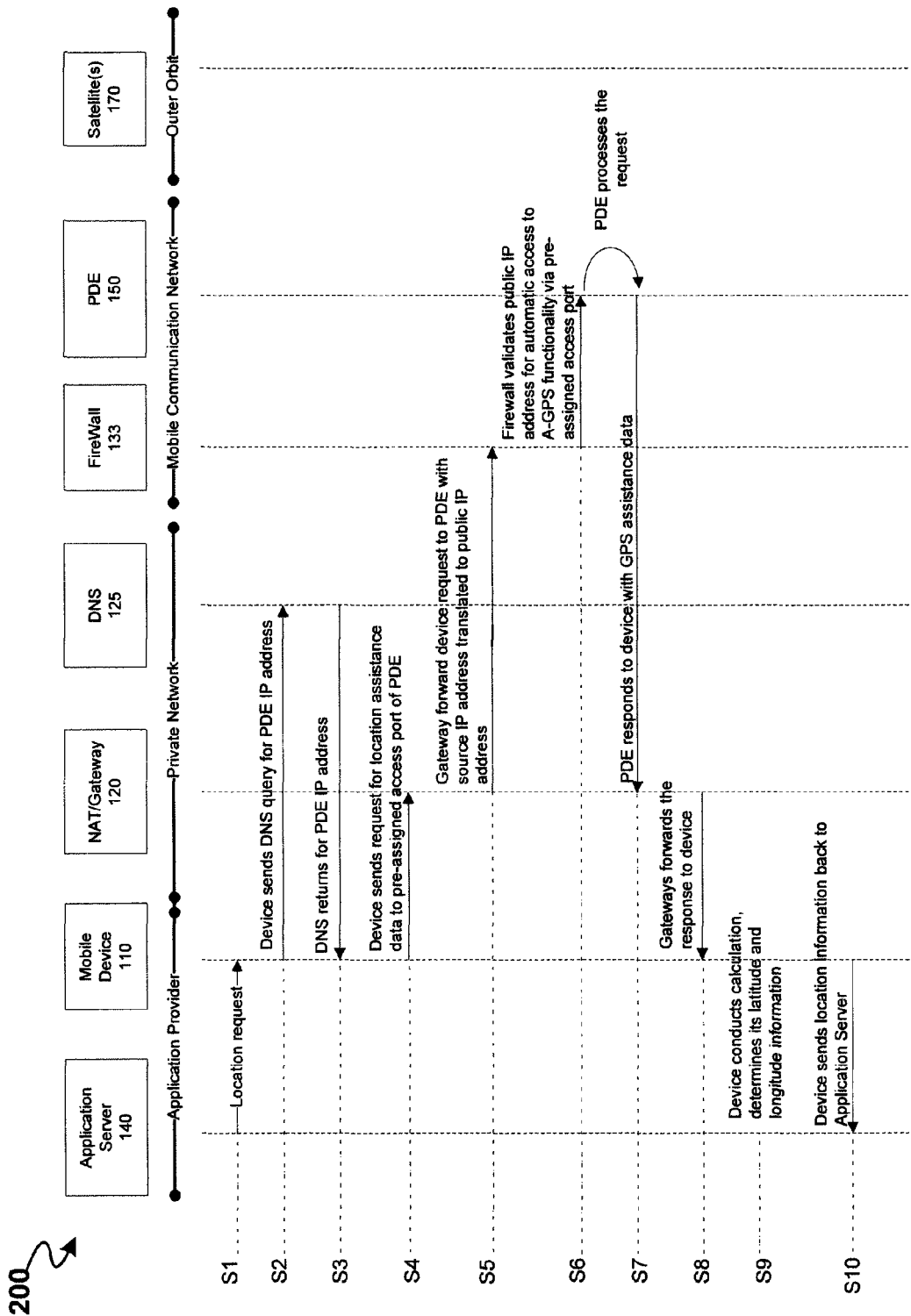
FIG. 2 is a flowchart of an exemplary process for providing a location assistance service to a mobile device on a private network.

FIG. 2 is a flowchart of an exemplary process 200 for providing a location assistance service to a mobile device (e.g., mobile device 110 of FIG. 1, as described above) on a private network (e.g., private network 132 of FIG. 1, as described above), without requiring proprietary messaging schemes or authentication credentials from the mobile device. For ease of discussion, process 200 will be described using network environment 100 of FIG. 1, but process 200 is not intended to be limited thereto. As described above, mobile device 110, application server 140, NAT 120 and DNS 125 are associated with a private network (e.g., private network 132) of an enterprise organization. Further, device 110 in this example may be a "non-traditional" mobile location device equipped with a Global Positioning System ("GPS") receiver, e.g., for purposes of tracking moveable assets of the enterprise (e.g., enterprise equipment in transport) through the private network. For this purpose, mobile device 110 communicates with application server 140 to implement the functionality of an enterprise location based application (e.g., asset tracking, as described above).

As shown in FIG. 2, application server 140, at step 1 (or "S1"), sends a location request to device 110 for its current geographic location based on location assistance information from PDE 150. In an example, a data access port of PDE 150 is pre-assigned to the particular location based application hosted at application server 140 associated with private network 132. Further, PDE 150 is preconfigured to designate all location assistance requests directed to the pre-assigned data access port as arriving from a trusted domain (e.g., private network 132 in this example). Accordingly, PDE 150 automatically processes requests for location assistance received at this access port, without performing any additional authentication. As described above, PDE 150 is located in a separate private network (e.g., private data network 136 of FIG. 1). Further, the separate private network may be part of a cellular or mobile communication network (e.g., mobile communication network 134), also as described above.

In response to the location request from application server 140, mobile device 110 at S2 queries DNS 125 of the private network to obtain the IP address of PDE 150, e.g., by resolving the Fully Qualified Domain Name (FQDN) associated with PDE 150. DNS 125 at S3 responds by returning the IP address of PDE 150 to mobile device 110. Mobile device 110 at S4 sends a request for location assistance data to PDE 150. As shown in the example of FIG. 2, the location assistance request from mobile device 110 is forwarded at S5 by NAT 120 or another gateway device of the private network to PDE 150. NAT 120, e.g., as gateway for the private network, translates the mobile device's 110 private originating address into a public IP address, as described above, and then forwards the location assistance request from mobile device 110 to PDE 150.

At S6, firewall 133 of the cellular private network receives the request from mobile device 110. In an example, firewall 133 validates the source IP address included in the location assistance request, which corresponds to the public IP address of mobile device 110. In this example, firewall 133 checks whether the public IP address in the location assistance request is within the range of authorized public IP addresses associated with the private network (or trusted domain) for which the dedicated access port of PDE 150 has been pre-assigned. If the source IP address is validated successfully by firewall 133 (or firewall 133 determines that the location assistance was originated from a trusted private network), firewall 133 forwards the location assistance request to PDE 150 for processing. In a different example, PDE 150 validates the location assistance request based on the public IP address included in the request, as will be described below with respect to FIG. 3.

Upon processing the location assistance request received from mobile device 110, PDE 150 at S7 sends a response including the requested location (e.g., GPS) assistance data to device 110. As described above, such location assistance data includes information that mobile device 110 can use to locate satellite(s) 170. For example, satellite(s) 170 may correspond to the nearest visible satellites relative to an approximate location of mobile device 110. Satellite(s) 170 may be identified by PDE 150 based on, for example, a predetermined proximity radius relative to this approximate location. In some implementations, the approximate location of mobile device 110 may be determined using location information derived from various sources that are less precise than GPS. Examples of these sources may include, but are not limited to, Wi-Fi access point(s) or other radio access points (e.g., access point 115 of FIG. 1) and CellID. In an example, PDE 150 may use cellular tower triangulation to determine an approximate location of mobile device 110.

Upon receiving the requested location assistance from PDE 150, e.g., via NAT 120 of the private network (S8), device 110 at S9 performs various calculations to determine, for example, its current GPS location (e.g., in the form of latitude and longitude coordinates). However, in some implementations, these calculations are performed by PDE 150 based on location measurements provided by mobile device 110, as described above with respect to an MSA mode of operation. Mobile device 110 at S10 sends its current geographic location (e.g., as determined on its own or as received from PDE 150) to application server 140, as requested at S1. In some implementations, the location assistance request and requested location assistance data may be transmitted in the form of Hyper Transport Transfer Protocol (HTTP) messages. However, it should be noted that the present techniques are not limited thereto and that the requests and data may be transmitted through the data connection using any of various communication protocols used for data transport.

Figure 3:
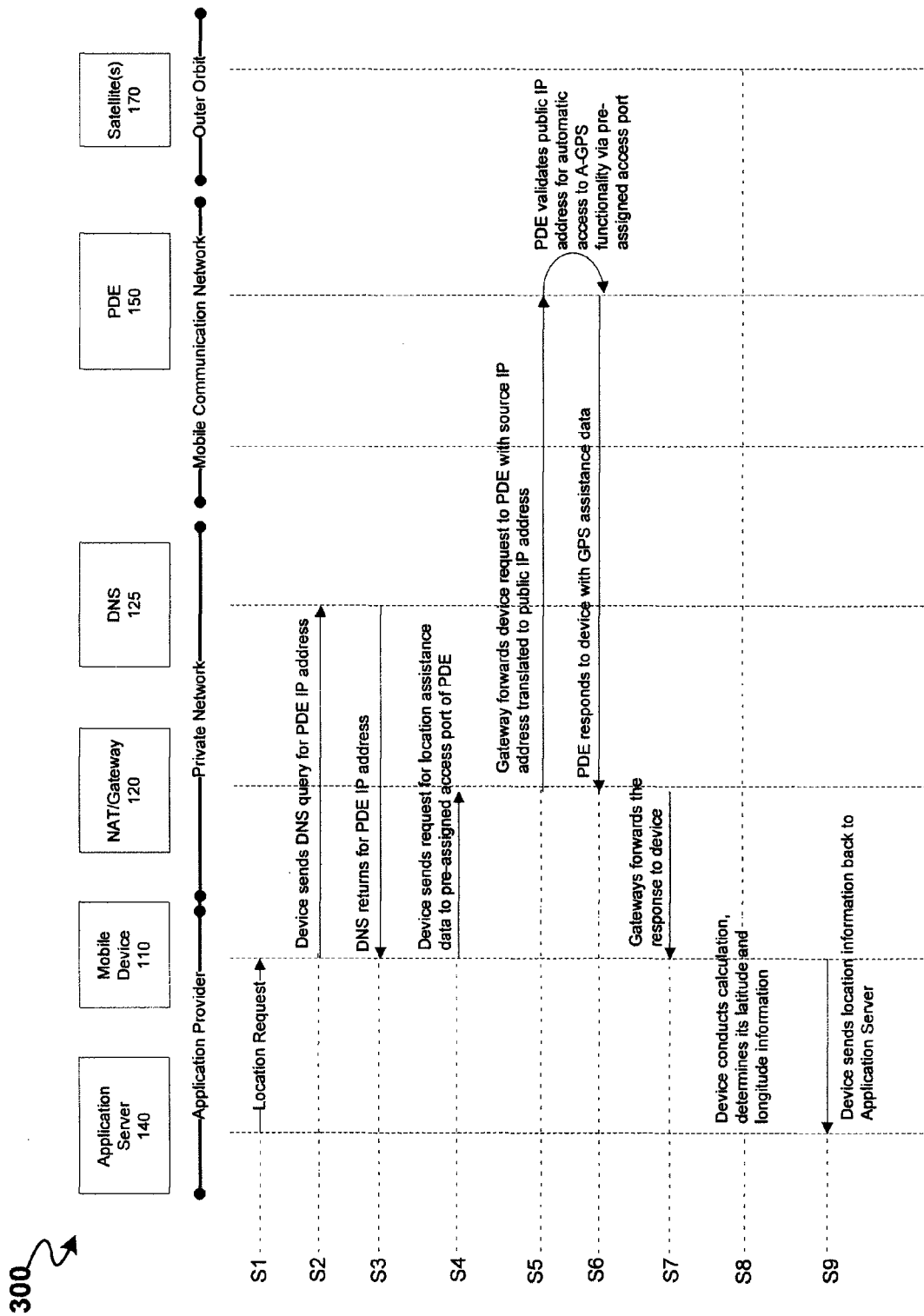
FIG. 3 is a flowchart of another exemplary process for providing a location assistance service to a mobile device on a private network.

FIG. 3 is a flowchart of an exemplary process 300 for providing a location assistance service to a mobile device (e.g., mobile device 110 of FIG. 1, as described above) on a private network (e.g., private network 132 of FIG. 1, as described above), without requiring proprietary messaging schemes or authentication credentials from the mobile device. The steps of process 300 are similar to that of process 200 of FIG. 2, described above, except that PDE 150, rather than firewall 133, validates the source IP address specified in the location assistance request received through the mobile communication network from mobile device 110 in this any device (including) on the private network.

Like process 200, for ease of discussion, process 300 will be described using network environment 100 of FIG. 1, but process 300 is not intended to be limited thereto. As described above, mobile device 110, application server 140, NAT 120 and DNS 125 are associated with a private network (e.g., private network 132) of an enterprise organization. Also, as described above, device 110 in this example may be a "non-traditional" mobile location device equipped with a Global Positioning System ("GPS") receiver, e.g., for purposes of tracking moveable assets of the enterprise (e.g., enterprise equipment in transport) through the private network, which communicates with application server 140 to implement the functionality of an enterprise location based application (e.g., asset tracking, as described above).

As shown in FIG. 3, application server 140 at S1 sends a location request to device 110 for its current geographic location based on location assistance information from PDE 150. As in process 200, a data access port of PDE 150 is pre-assigned to the particular location based application hosted at application server 140 associated with the private network or trusted domain, as described above. In response to the location request from application server 140, mobile device 110 at S2 queries DNS 125 of the private network to obtain the IP address of PDE 150, e.g., by resolving the Fully Qualified Domain Name (FQDN) associated with PDE 150. DNS 125 at S3 responds by returning the IP address of PDE 150 to mobile device 110. Mobile device 110 at S4 sends a request for location assistance data to PDE 150. As shown in the example of FIG. 2, the location assistance request from mobile device 110 is forwarded at S5 by NAT 120 or another gateway device of the private network to PDE 150. NAT 120, e.g., as gateway for the private network, translates the mobile device's 110 private originating address into a public IP address, as described above, and then forwards the location assistance request from mobile device 110 to PDE 150.

At S6, PDE 150 receives the request from mobile device 110, e.g., via NAT 120 of the private network. Like firewall 133 in process 200, PDE 150 validates the source IP address included in the location assistance request, which corresponds to the public IP address of mobile device 110. Also, like firewall 133, PDE 150 in this example checks whether the public IP address included in the location assistance request is within the range of authorized public IP addresses associated with the private network (or trusted domain) for which the dedicated access port of PDE 150 has been pre-assigned. In some implementations, PDE 150 queries one or more database tables that map IP addresses (or address ranges) to different access ports, where each access port corresponds to a different private network (or private network application) that has been previously authenticated. The IP address table(s) may be stored in a database in the cellular network (e.g., database 155 of FIG. 1, as described above).

Upon processing the location assistance request received from mobile device 110, PDE 150 at S7 sends a response including the requested location (e.g., GPS) assistance data to device 110. As described above, such location assistance data can be used by mobile device 110 at S9 to perform various calculations to determine, for example, its current GPS location (e.g., in the form of latitude and longitude coordinates), after receiving the requested location assistance data from PDE 150 and forwarded by NAT 120 at S8 via the private network. However, in some implementations, these calculations are performed by PDE 150 based on location measurements provided by mobile device 110, as described above with respect to an MSA mode of operation. Mobile device 110 at S10 sends its current geographic location (e.g., as determined on its own or as received from PDE 150) to application server 140, as requested at S1.

Figure 4:
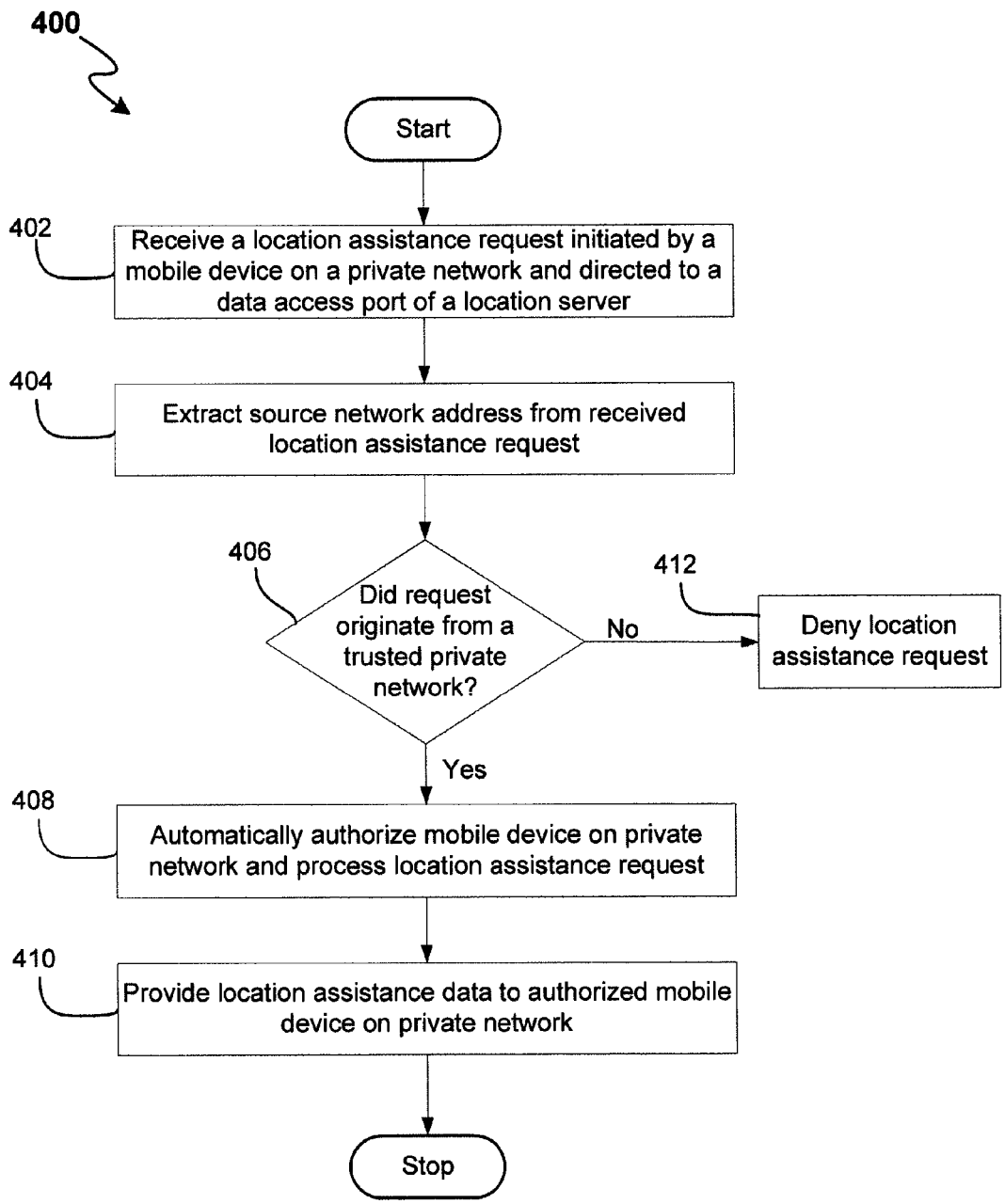
FIG. 4 is a process flowchart of an exemplary method for providing location assistance services for a mobile device on a private network.

FIG. 4 is a process flowchart of an exemplary method 400 for providing a location assistance service to a mobile device (e.g., mobile device 110 of FIG. 1, as described above) on a private network (e.g., private network 132 of FIG. 1, as described above), without requiring proprietary messaging schemes or authentication credentials from the mobile device. In an example, the steps of method 400 may be performed by, for example and without limitation, PDE 150 of FIGS. 1-3, as described above.

Method 400 begins in step 402, which includes receiving a location assistance request initiated by a mobile device on a private network and directed to a data access port of a location server of a mobile communication network. In some implementations, the data access port is a dedicated access port assigned to a trusted domain, as described above. As such, mobile devices of the trusted domain are automatically authenticated by the location server for accessing location assistance services provided by the server. In step 404, a source network address is extracted from the location assistance request received in step 402. The source network address may be, for example, an Internet Protocol (IP) address. In step 406, method 400 uses the extracted source address to determine whether or not the request originated from or was initiated by a device on a trusted domain. For example, step 406 may include determining whether the extracted source network address is one of a plurality or range of public network (IP) addresses associated with the trusted domain.

Upon determining that the request was initiated by a device on a trusted domain (e.g., the extracted source network address is associated with the trusted domain), method 400 proceeds to step 408. Step 408 includes automatically authorizing the mobile device on the private network and processing the location assistance request. The location assistance data is obtained by the location server based on, for example, an approximate geographic location determined for the mobile device on the private network. The approximate location of the device may be determined based on, for example, a Wi-Fi access point (e.g., access point 115 of FIG. 1, as described above) used by the private network to locate and communicate with multiple mobile devices on the private network. In step 410, the requested location assistance data obtained by the location server is provided to the authorized mobile device on the private network. If the request is determined in step 406 not to be from a trusted domain (e.g., based on the source network address extracted in step 404), method 400 proceeds to step 412, in which access to the location assistance request is denied.

A general-purpose computer having data processing and communications capabilities typically comprises a central processor or other processing device, an internal communication bus, various types of memory or storage media (RAM, ROM, EEPROM, cache memory, disk drives etc.) for code and data storage, and one or more network interface cards or ports for communication purposes. Using the location server described above (e.g., PDE 150 of FIGS. 1-3) as an example, different functionalities of the location assistance service provided by the location server may be implemented in software. The software functionalities involve programming, including executable code as well as associated stored data, as described herein. The software code is executable by the general-purpose computer. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for, in essentially the manner performed in the implementations discussed and illustrated herein.

Figure 5:
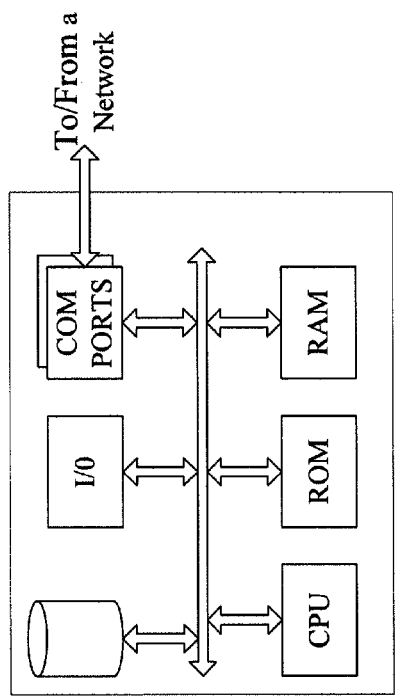
FIG. 5 is a simplified functional block diagram of an example computer that may be configured as a host or server in the network environment of FIG. 1.
Figure 6:
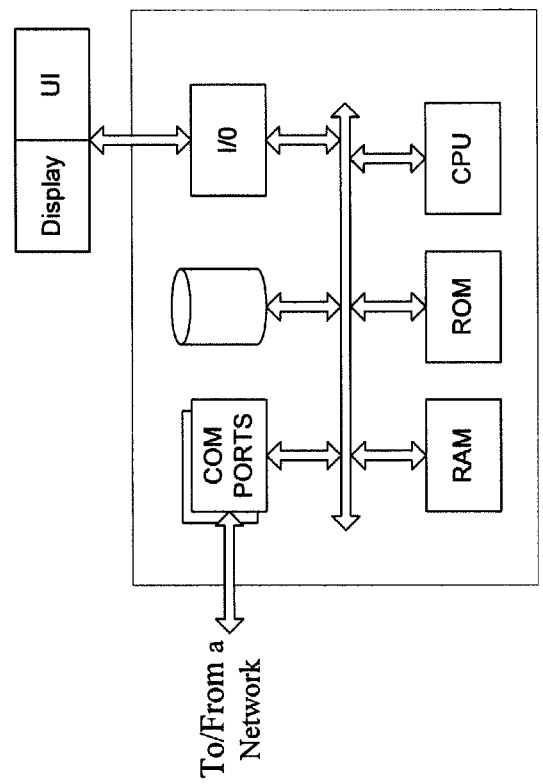
FIG. 6 is a simplified functional block diagram of an example personal computer or other work station or terminal device in the network environment of FIG. 1.

FIGS. 5 and 6 provide functional block diagram illustrations of general purpose computer hardware platforms. FIG. 5 illustrates a network or host computer platform, as may typically be used to implement a server (e.g., firewall 133 or PDE 150 of FIGS. 1-3, as described above). FIG. 6 depicts a computer or workstation device with user interface elements, as may be used to implement a personal computer (e.g., device 102 of FIG. 1, as described above). It is believed that the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of the various systems and system components within network environment 100 of FIG. 1 (e.g., firewall 133 or PDE 150), as described above, may be embodied in programming. Program aspects of the technology may be thought of as "products" or "articles of manufacture" typically in the form of executable code or process instructions and/or associated data that is stored on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a web application/service provider into the computer platform of the application or web server that will be hosting the web application/service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer" or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functions performed by the various components of network environment 100 of FIG. 1, e.g., as described above with respect to exemplary processes 200, 300 and 400 of FIGS. 2-4, respectively. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As noted above, the computer as illustrated in the example of FIG. 5 may be a network or host computer, as may typically be used to implement a server (e.g., a location assistance server or PDE 150 of FIG. 1, as described above). As shown in FIG. 6, such a server may include a central processor or other processing device, an internal communication bus, various types of memory or storage media (RAM, ROM, EEPROM, cache memory, disk drives, etc.) for code and data storage, and one or more network interface cards or ports for communication purposes. Also, the mobile computer can further comprise various wireless transceiver modules (or components) such as GPS, WiFi, IrDA, Bluetooth, etc. Using the example of a location assistance server (e.g., PDE 150 of FIGS. 1-3, as described above), various location assistance functionalities may be implemented in software. Such software functionalities involve programming, including executable code, associated stored data, and graphical user interface code for implementing a location assistance application or service at the server. The software code is executable by the processor of the server. In operation, the code is stored within the server or local data store. At other times, however, the software may be stored at other locations (e.g., database 155 of FIG. 1, as described above) and/or transported for loading into the server. Execution of such code by a processor of the server enables the server to implement the methodology for providing location assistance data (e.g., GPS assistance data) in response to a location assistance request from a mobile device (e.g., mobile device 110 of FIGS. 1-3, as described above), in essentially the manner performed in the implementation discussed and illustrated herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1XRTT—One (1) times (x) Radio Transmission Technology
3GPP—Third (3rd) Generation Partnership Project
3GPP2—Third (3rd) Generation Partnership Project 2
ADPU—Application Protocol Data Unit
BS—Base Station
BTS—Base Transceiver System
CAT—Card Application Toolkit
CCAT—CDMA Card Application toolkit
CD—Compact Disk
CDMA—Code Division Multiple Access
CD-ROM—Compact Disk-Read Only Memory
CPU—Central Processing Unit
CSIM—CDMA Subscriber Identity Module
DVD—Digital Video Disk
DVD-ROM—Digital Video Disk-Read Only Memory
EEPROM—Electrically Erasable Programmable Read Only Memory
EF—Elementary File
EPROM—Erasable Programmable Read Only Memory
EVDO—1x/Evolution—Data Only
GSM—Global System for Mobile Communications
ICCID—Integrated Mobile Equipment Identity
ID—Identification
IMEI—International Mobile Equipment Identity
IMSI—International Mobile Subscriber Identity
IR—InfraRed
ISIM—IP Multimedia Services Identity Module
LTE—Long Term Evolution
MDN—Mobile Directory Number
MEID—Mobile Equipment Identifier
MF—Master File
MIN—Mobile Identification Number
OTAF—Over-The-Air Functionality
OTAPA—Over the Air Parameter Administration
OTASP—Over the Air Service Programming
PC—Personal Computer
PCS—Personal Communication Service
PDA—Personal Digital Assistant
PGW—Packet Gateway
PIN—Personal Identification Number
PRL—Preferred Roaming List
PROM—Programmable Read Only Memory
PSTN—Public Switched Telephone Network
RAM—Random Access Memory
RAN—Radio Access Network
RF—Radio Frequency
ROM—Read Only Memory
R-UIM—Removable-User Identity Module
SIM—Subscriber Identity Module
SMS—Short Message Service
SMS-PP—Short Message Service—Point to Point
UICC—Universal Integrated Circuit Card
UIM—User Identity Module
UMTS—Universal Mobile Telecommunications Systems
USAT—Universal SIM Application Toolkit
USIM—Universal Subscriber Identity Module
WAN—Wide Area Network
XCVR—Transceiver

What is claimed is:
1. A computer-implemented method comprising steps of:
receiving a location assistance request directed to a data access port of a location server in a mobile communication network;

extracting a source network address from the received location assistance request;

determining whether or not the location assistance request was originated by a mobile device on a trusted private network based on the extracted source network address;

when it is determined that the location assistance request was originated by a mobile device on a trusted private network, processing the location assistance request at the location server for the mobile device, without authenticating the mobile device on the trusted private network for location assistance provided by the location server in the mobile communication network, including:

determining a current geographic location of the mobile device based on geo-location or positioning signals received from an access point of the trusted private network that is located nearest to the mobile device; and determining a satellite location of a satellite within a predetermined proximity radius of the current geographic location of the mobile device; and transmitting a response including location assistance data indicating the determined satellite location from the location server in the mobile communication network to the mobile device on the private network, based on the processing of the location assistance request.

2. The method of claim 1, wherein the trusted private network is associated with a plurality of public network addresses, and the determining step comprises:

querying a database table for a public network address corresponding to the extracted source network address, the database table identifying the plurality of network addresses associated with the trusted private network.

3. The method of claim 1, wherein the location server is a Position Determining Entity (PDE) of the mobile communication network.

4. The method of claim 1, wherein the data access port assigned to the trusted domain is one of a plurality of data access ports, and each of one or more data access ports is dedicated to a different trusted domain.

5. The method of claim 1, further comprising:

receiving, from a second mobile device, a second location assistance request directed to the data access port of the location server in the mobile communication network;

extracting a source network address of the second mobile device from the received second location assistance request;

determining whether or not the second mobile device originated the second location request from a trusted private network based on the extracted source network address of the second mobile device; and when the extracted source network address of the second mobile device is determined not to be associated with a trusted private network, denying location assistance for the second mobile device.

6. The method of claim 1, wherein the location assistance request is received at the location server directly from the mobile device on the private network, and the location server is configured to validate the source network address received with the location assistance request.

7. The method of claim 1, wherein the location assistance request is received at a firewall of the mobile communication network, wherein:

the processing step further comprises forwarding the received location assistance request to the data access port of the location server, and the transmitting step further comprises sending the location assistance data to the mobile device on the private network, upon receiving the location assistance data from the location server.

8. The method of claim 7, wherein the location assistance request from the mobile device is received at the firewall from a gateway server of the private network, and the location assistance data is sent to the gateway server, and the gateway server forwards the location assistance data to the mobile device.

9. The method of claim 1, wherein the access point is a hub for radio communications.

10. A server system comprising:

a network communication device configured to exchange data communications through a communication network, the communication network including at least one database accessible to the network communication device;

a processor coupled to the network communication device;

a storage device accessible to the processor; and an application program in the storage device, the application program including functions of a location assistance service application, wherein execution of the application program by the processor configures the server system to exchange data communications related to the plurality of functions with one or more client devices through the communication network, wherein the processor is configured to perform the functions of the location assistance service application, including functions to:

receive a location assistance request directed to a data access port of a location server in a mobile communication network;

extract a source network address from the received location assistance request;

determine whether or not the location assistance request was originated by a mobile device on a trusted private network based on the extracted source network address;

process the location assistance request at the location server for the mobile device, without authenticating the mobile device on the trusted private network for location assistance provided by the location server in the mobile communication network, when it is determined that the location assistance request was originated by a mobile device on a trusted private network, including:

determine a current geographic location of the mobile device based on geo-location or positioning signals received from an access point of the trusted private network that is located nearest to the mobile device; and determine a satellite location of a satellite within a predetermined proximity radius of the current geographic location of the mobile device; and transmit a response including location assistance data indicating the determined satellite location from the location server in the mobile communication network to the mobile device on the private network, based on the processing of the location assistance request.

11. The system of claim 10, wherein the location server is a Position Determining Entity (PDE) of the mobile communication network.

12. The system of claim 10, wherein the data access port assigned to the trusted domain is one of a plurality of data access ports, and each of one or more data access ports is dedicated to a different trusted domain.

13. The system of claim 10, wherein the functions performed by the processor further include functions to:
- receive, from a second mobile device, a second location assistance request directed to the data access port of the location server in the mobile communication network;
- extract a source network address of the second mobile device from the received second location assistance request;
- determine whether or not the second mobile device originated the second location request from a trusted private network based on the extracted source network address of the second mobile device; and
- deny location assistance for the second mobile device, when it is determined that the extracted source network address of the second mobile device is not associated with a trusted private network.

14. The system of claim 10, wherein the location assistance request is received at the location server directly from the mobile device on the private network, and the location server is configured to validate the source network address received with the location assistance request.

15. The system of claim 10, wherein the trusted private network is associated with a plurality of public network addresses, and the functions performed by the processor further include a function to:
- query a database table for a public network address corresponding to the extracted source network address, the database table identifying the plurality of network addresses associated with the trusted private network.

16. The system of claim 15, wherein each network address is an Internet Protocol (IP) address.

17. The system of claim 10, wherein the location assistance request is received at a firewall of the mobile communication network, wherein the received location assistance request is forwarded to the data access port of the location server, and the location assistance data is sent to the mobile device on the private network, when the location assistance data is received from the location server.

18. The system of claim 17, wherein the location assistance request from the mobile device is received at the firewall from a gateway server of the private network, and the location assistance data is sent to the gateway server, and the gateway server forwards the location assistance data to the mobile device.

19. The system of claim 10, wherein the access point is a hub for radio communications.

20. An article of manufacture, comprising a non-transitory computer-readable medium and computer-executable instructions embodied in the medium that, if executed by a computing device, cause the computing device to perform functions, comprising:
- receiving a location assistance request directed to a data access port of a location server in a mobile communication network;
- extracting a source network address from the received location assistance request;
- determining whether or not the location assistance request was originated by a mobile device on a trusted private network based on the extracted source network address;
- when it is determined that the location assistance request was originated by a mobile device on a trusted private network, processing the location assistance request at the location server for the mobile device, without authenticating the mobile device on the trusted private network for location assistance provided by the location server in the mobile communication network, including:
  - determining a current geographic location of the mobile device based on geo-location or positioning signals received from an access point of the trusted private network located that is located nearest to the mobile device; and
  - determining a satellite location of a satellite within a predetermined proximity radius of the current geographic location of the mobile device; and
- transmitting a response including location assistance data indicating the determined satellite location from the location server in the mobile communication network to the mobile device on the private network, based on the processing of the location assistance request.

* * * * *